United States Patent
Kolehmainen et al.

[11] 3,888,143
[45] June 10, 1975

[54] DUAL DIAPHRAGM ACTUATOR FOR A TRANSMISSION THROTTLE VALVE ASSEMBLY

[75] Inventors: Jack A. Kolehmainen, Detroit; George E. Lemieux, Livonia, both of Mich.

[73] Assignee: Ford Motor Company, Dearborn, Mich.

[22] Filed: Aug. 16, 1973

[21] Appl. No.: 389,065

Related U.S. Application Data

[62] Division of Ser. No. 240,916, April 4, 1972, Pat. No. 3,765,272.

[52] U.S. Cl. .......... 74/863; 74/864; 74/844; 123/119 A
[51] Int. Cl. .......... B60k 23/00; F02m 27/02
[58] Field of Search .......... 74/863, 864, 844; 123/119 A

[56] References Cited
UNITED STATES PATENTS

| | | | |
|---|---|---|---|
| 3,377,922 | 4/1968 | Spender et al. | 74/844 X |
| 3,688,606 | 9/1972 | Lemieux et al. | 74/844 X |
| 3,739,797 | 6/1973 | Caldwell | 123/119 A X |
| 3,765,272 | 10/1973 | Kolehmainen et al. | 74/863 |
| 3,768,339 | 10/1973 | Kolehmainen et al. | 74/864 |

Primary Examiner—Samuel Scott
Assistant Examiner—P. S. Lall
Attorney, Agent, or Firm—Donald J. Harrington; Keith L. Zerschling

[57] ABSTRACT

An automatic transmission throttle valve assembly that responds to engine intake manifold pressure due to the operation of engine exhaust gas recirculation controls for reducing undesired exhaust gas emissions.

4 Claims, 10 Drawing Figures

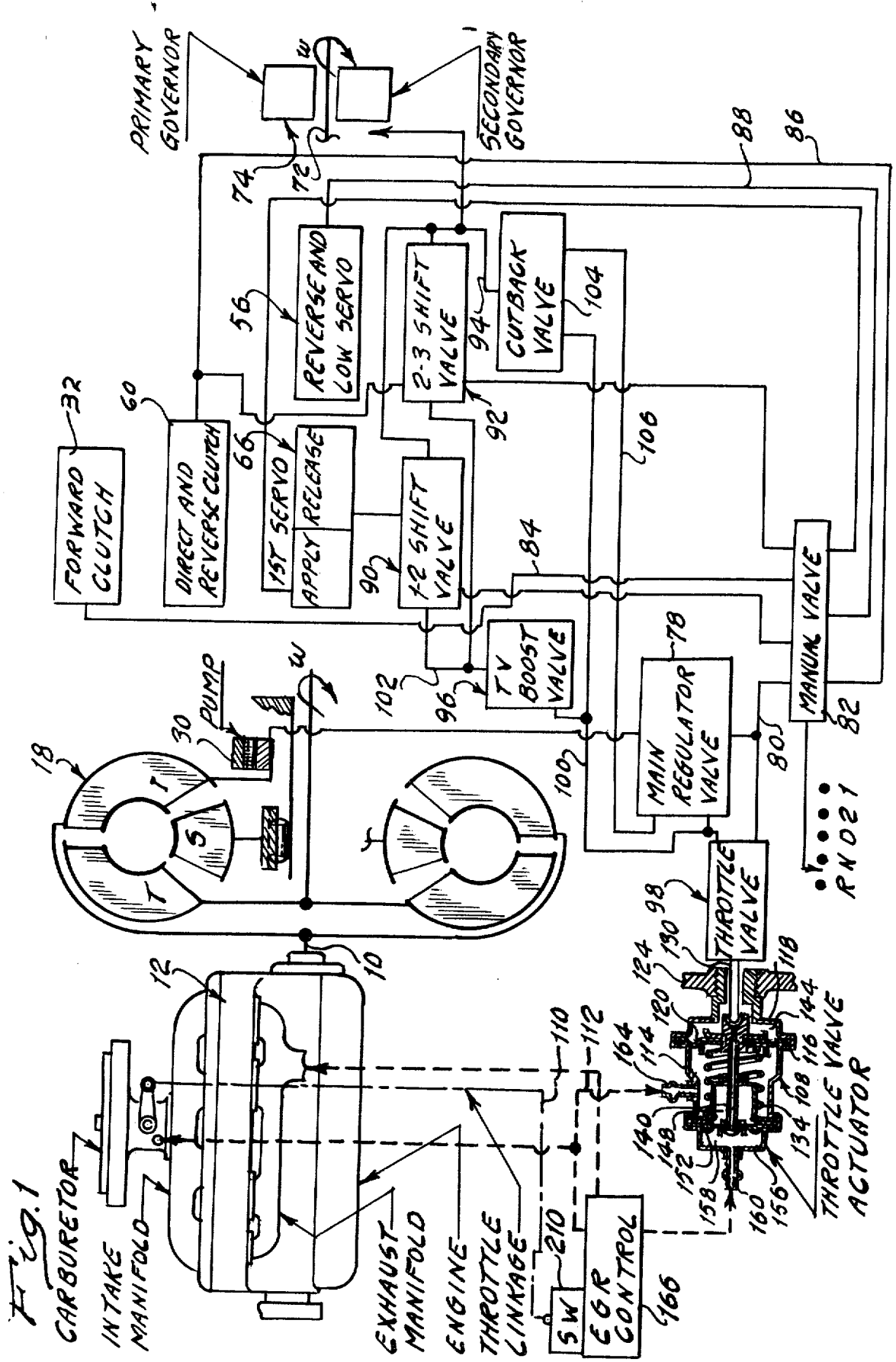

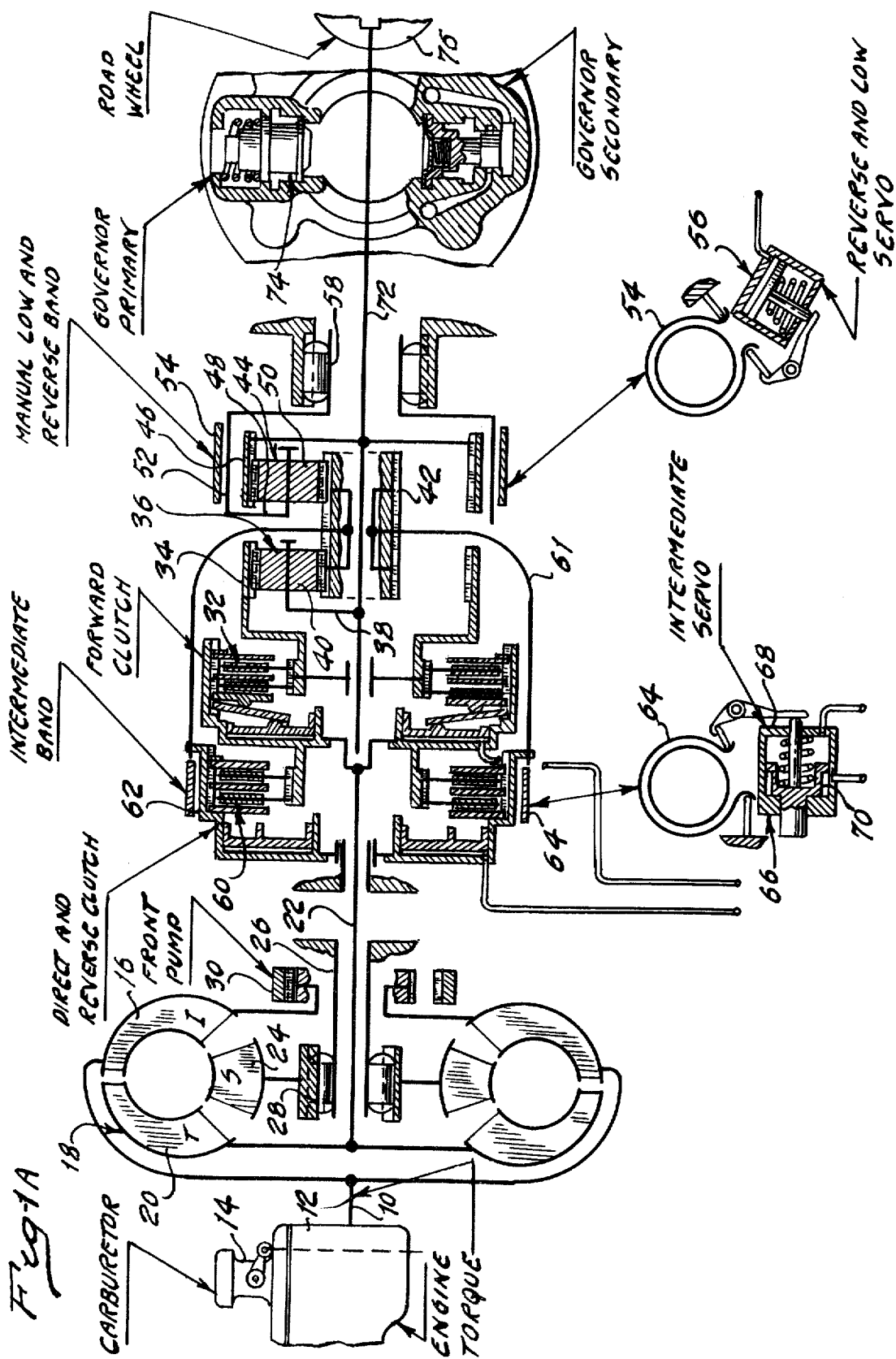

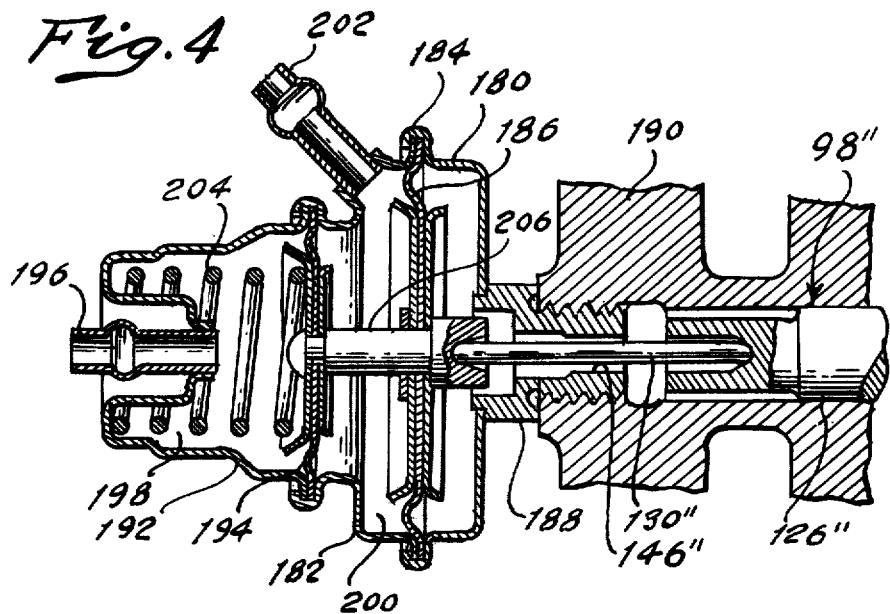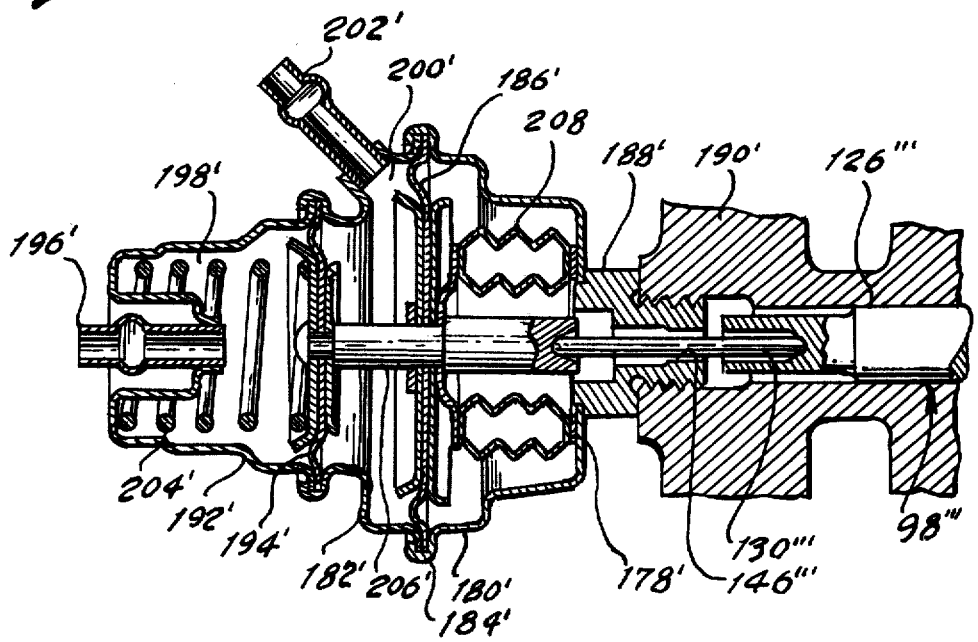

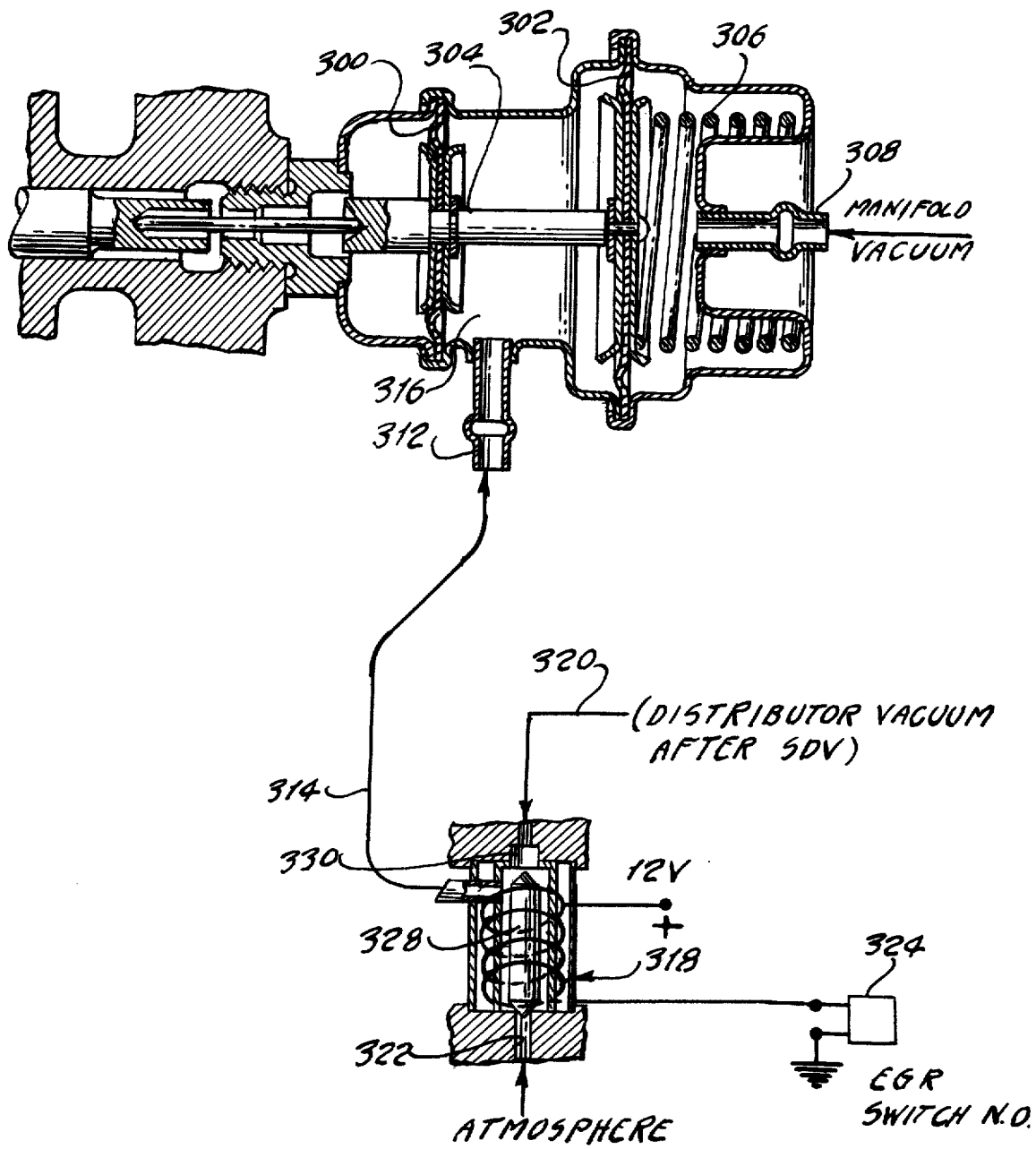

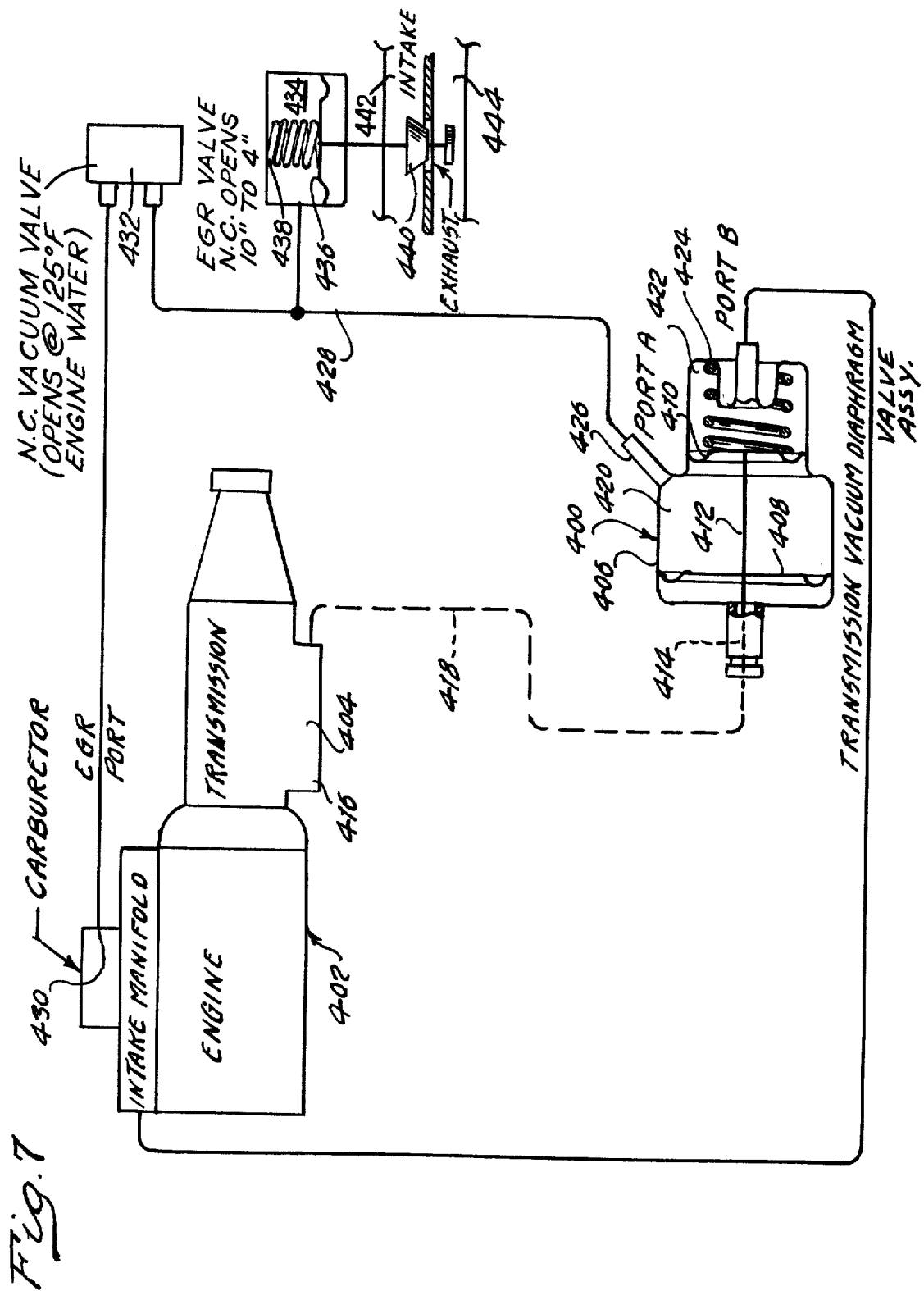

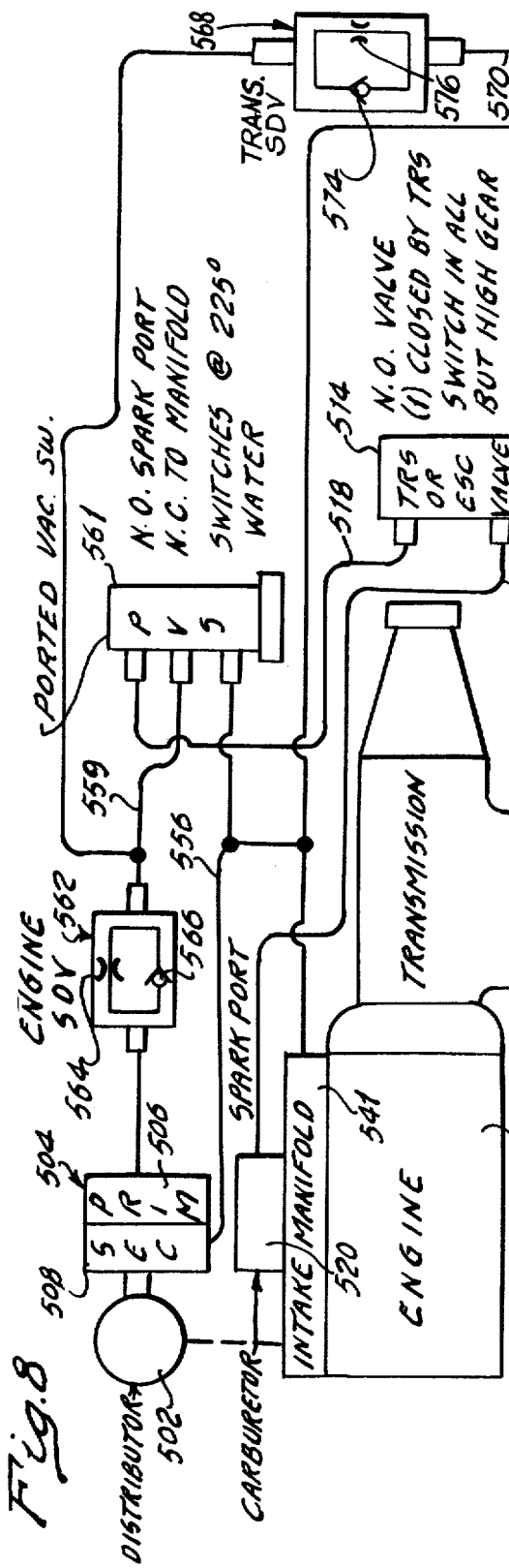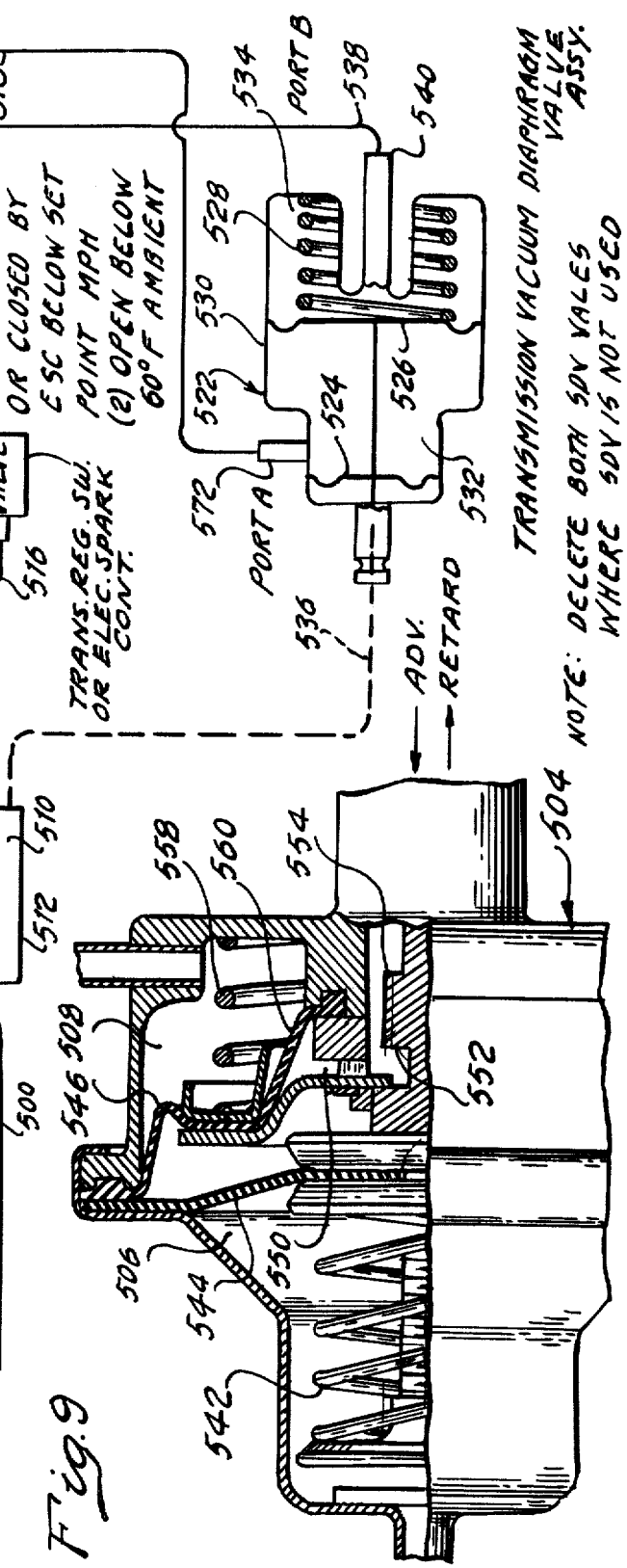

DUAL DIAPHRAGM ACTUATOR FOR A TRANSMISSION THROTTLE VALVE ASSEMBLY

REFERENCE TO RELATED DISCLOSURES

This is a division of application Ser. No. 240,916, filed Apr. 4, 1972, now U.S. Pat. No. 3,765,272.

GENERAL DESCRIPTION OF THE INVENTION

Our invention relates to controls for automatic power transmission mechanisms in automotive vehicle drivelines with internal combustion engines.

In an automatic power transmission mechanism for automotive vehicles having internal combustion engines, it is necessary to establish a torque signal that can be used by the transmission control system to effect ratio changes and to control the operating pressure level of fluid pressure operated servos for the transmission clutches and brakes. Usually the transmission mechanism is capable of establishing at least two forward driving speed ratios, and ratio changes from one to the other are accomplished by shift valves that respond to a torque signal as well as a speed signal, the latter being developed by a fluid pressure governor valve mechanism connected drivably to the transmission power output shaft.

A fairly accurate torque signal can be obtained by a transmission vacuum diaphragm valve assembly having a throttle valve that modulates pressure from a transmission control pressure pump driven by the power input shaft for the transmission. The throttle valve is actuated by a vacuum diaphragm assembly which is in communication with the engine intake manifold. The throttle valve then is responsive to changes in manifold pressure to effect appropriate changes in the output modulated pressure.

In contemporary drivelines for engine powered vehicles it is necessary or desirable to reduce the concentrations of oxides of nitrogen, unburned hydrocarbons, carbon monoxide and other exhaust gas pollutants. This may be done by a so-called exhaust gas recirculation system wherein a portion of the exhaust gases is recirculated back to the engine intake manifold and then recycled through the combustion process. This tends to eliminate or reduce certain oxides and unburned hydrocarbons through further combustion and to reduce the combustion temperatures in the engine cylinders.

Recirculation of exhaust gases in this fashion is achieved by exhaust gas emission controls which may be made to establish recirculation and disestablish recirculation at optimum times during the total operating cycle. For example, it is desirable to interrupt exhaust gas recirculation when the engine block temperatures exceed a desired level such as 160°F. Exhaust gas recirculation controls, therefore, include a thermostatically operated valve that responds to engine coolant temperature either to interrupt or to establish an exhaust gas flow path to the engine intake manifold as the coolant temperature changes. The exhaust gas recirculation control, hereafter referred to as an EGR control, is capable also of interrupting exhaust gas recirculation during "idle" operation to avoid undesirable engine "idle" performance. It may also interrupt exhaust gas recirculation whenever the engine intake manifold vacuum exceeds approximately three inches of mercury. The EGR control may include also a speed sensitive element that causes the EGR control to interrupt exhaust gas recirculation whenever the driven speed of the vehicle exceeds an upper limit, such as 60 m.p.h.

During operation of the vehicle the EGR control may establish and interrupt several times the exhaust flow path for exhaust gas recirculation purposes. This then changes the relationship of engine intake manifold pressure to torque. It is impossible, therefore, to use engine intake manifold to establish a constant engine torque signal at the transmission throttle valve which might be used by the transmission control system. For example, a given engine intake manifold pressure would correspond to a first engine torque when the EGR control is inactive, but that same engine intake manifold pressure would correspond to a lower torque if the EGR control is active. If an appropriate compensation were to be made in the throttle valve system for the transmission, an excessive control pressure would be made available to the control system for the transmission during ratio changes when the EGR control is active. That would result in harsh ratio shifts and excessive circuit pressures.

Other types of exhaust gas emission controls include devices that interrupt the engine distributor vacuum advance under reduced throttle operating conditions. The engine ignition timing, which normally is advanced by engine intake manifold pressure, is retarded by a spark delay valve to reduce emissions. Like the EGR controls, these additional emission controls affect the calibration of the transmission throttle valve system.

It is an object of our invention to provide an improved throttle valve system in an engine that has an EGR control or an engine spark ignition delay valve, or both, whereby a constant transmission torque signal may be obtained regardless of whether the EGR control or the spark delay valve is active or inactive. We have accomplished this objective by providing a transmission throttle valve actuator that comprises a double diaphragm assembly that cooperates with the actuator housing to define separate manifold pressure chambers. A first diaphragm area is subjected to engine intake manifold pressure when the EGR control is active. A second diaphragm area is subjected to manifold pressure when the EGR control is inactive so that the resultant diaphragm forces are additive. Corresponding diaphragm area changes are made to compensate for the effect of spark delay. If it is desired to provide calibration for the transmission throttle valve during "idle" operation of the engine so that the control pressure level for the control system will be reduced, provision may be made for connecting both diaphragm areas to the engine intake manifold. When the engine throttle is advanced from the fully-closed idle position, the "idle" vacuum control is deactivated so that only a single diaphragm area is subjected to intake manifold pressure.

BRIEF DESCRIPTION OF THE FIGURES OF THE DRAWING

FIG. 1 shows a schematic assembly view of our improved dual diaphragm throttle valve assembly in an automotive transmission installation.

FIG. 1A shows a gearing arrangement adapted to be controlled by a control system having the improved throttle valve arrangement of our invention.

3

Figure 3:
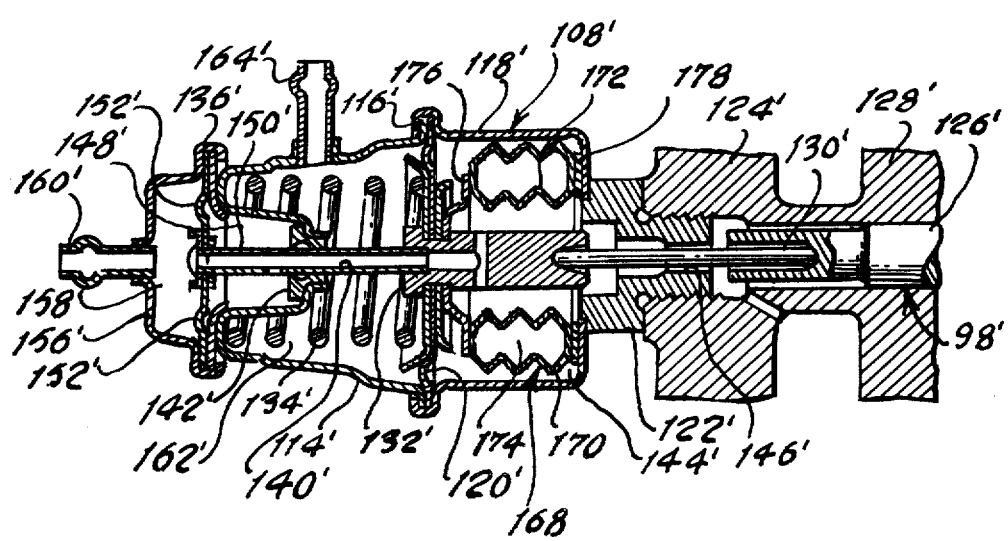

FIG. 3 is a view of an actuator similar to that shown in FIG. 1 although an altitude compensating bellows has been added to compensate for changes in atmospheric pressure due to changes in altitude.

Figure 2:
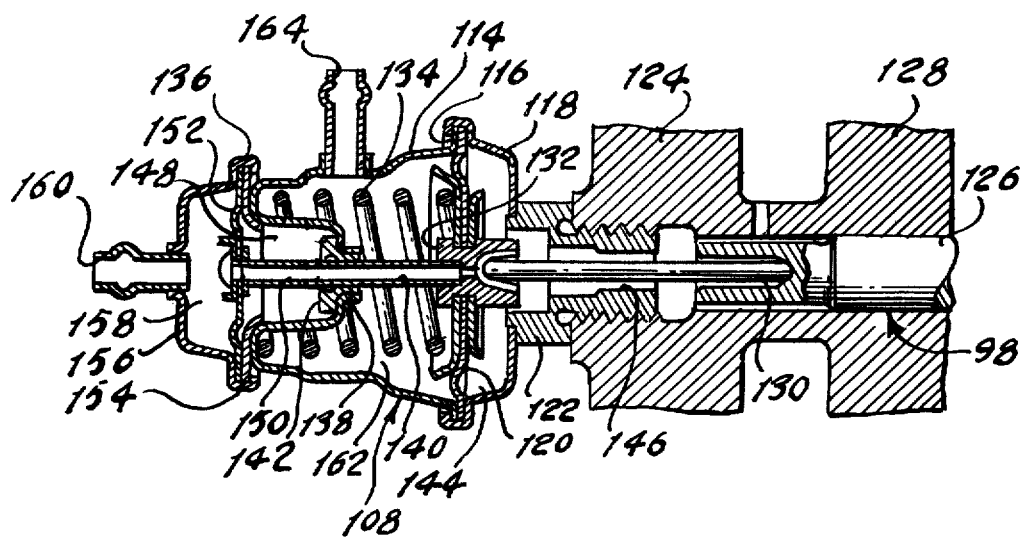
FIG. 2 is an enlarged view of the throttle valve actuator used in the system of FIG. 1.

FIG. 4 shows a second modification of our invention wherein the connections between the EGR control and the engine intake manifold are interchanged with respect to the arrangement shown in FIG. 2.

FIG. 5 shows a third modification of our invention which is similar to the construction shown in FIG. 4 although an altitude compensating bellows has been added to compensate for changes in atmospheric pressure.

FIG. 6 shows a fourth modification and a switching circuit for controlling it.

FIG. 7 is a schematic drawing of an exhaust gas recirculation system including a dual diaphragm transmission throttle valve assembly similar to the one shown in FIG. 4.

FIG. 8 is a schematic drawing of a spark delay system using a dual diaphragm throttle valve assembly similar to the one shown in FIG. 6.

FIG. 9 shows in cross sectional form an actuator for advancing and retarding the timing for the distributor used with the engine shown in FIG. 8.

PARTICULAR DESCRIPTION OF THE INVENTION

Numeral 10 indicates one end of the crankshaft of an internal combustion engine. The engine is shown in FIG. 1 at 12. Shaft 10 is connected to the impeller of the hydrokinetic torque converter 18. Turbine 20 is situated in toroidal fluid flow relationship with respect to the impeller 16. It is connected drivably to turbine shaft 22. Bladed stator 24 is situated between the fluid flow outlet region of turbine 20 and the fluid flow inlet region of the impeller 16. It is journalled for rotation on stationary stator sleeve shaft 26 and it is anchored against rotation in a direction opposite to the direction of rotation of the engine by overrunning brake 28. Freewheeling motion of the stator 24 in the opposite direction is permitted.

Positive displacement pump 30 is connected drivably to impeller 16. Pump 30 serves as a pressure source for the control circuit to be described with reference to FIG. 2.

Turbine shaft 22 is connected to the torque input side of a forward clutch 32. This establishes selectively a frictional driving connection between the shaft 22 and ring gear 34 for a first simple planetary gear unit 36.

Gear unit 36 includes, in addition to ring gear 34, a carrier 38, planet pinions 40 journalled on the carrier 38 and sun gear 42. Sun gear 42 is common to a second simple planetary gear unit 44 which includes, in addition to the sun gear, ring gear 46, carrier 48 and planet pinions 50 journalled on the carrier 48 in meshing engagement with the ring gear and the sun gear. Carrier 48 is connected directly to the reaction brake drum 52 about which is positioned a friction brake band 54. Brake band 54 is adapted to be applied and released by a fluid pressure operated reverse-and-low servo 56, thereby providing a torque reaction during operation in manual-low and reverse drive operation.

Overrunning brake 58 is interposed between the drum 52 and the housing for the transmission mechanism. Brake 58 provides a torque reaction point during acceleration from a standing start in the lowest speed ratio.

4

Shaft 22 is connected also to the torque input side of a direct-and-reverse clutch 60. The output side of the clutch 60 is connected to sun gear 42 through a drive shell 61 which encircles the clutch 32 and the gear unit 36. The output side of the clutch 60 defines also brake drum 62 about which is positioned intermediate speed ratio brake band 64. This band may be applied and released by fluid pressure operated intermediate servo 66. Servo 66 includes the cylinder 68 and a double-acting piston 70 disposed in the cylinder 68 to define a pair of opposing pressure chambers. When both chambers are pressurized or exhausted, the servo is released. When the chamber on the right-hand side of the piston is pressurized, the servo actuates the brake band causing brake application.

Ring gear 46 and carrier 38 are connected drivably to power output shaft 72. A governor valve assembly comprising a primary governor and a secondary governor is connected drivably to the shaft 72 so that it may develop a speed signal that is proportional in magnitude to the speed of rotation of shaft 72. The governor assembly is indicated by reference character 74. Shaft 72 in turn is connected to the road wheels 76 through a suitable driveshaft and differential-and-axle assembly.

The transmission mechanism of FIG. 1 is capable of establishing three forward-driving speed ratios and a single reverse speed ratio. The lowest forward driving speed ratio is obtained by engaging forward clutch 32, which remains applied during operation in each of the two other forward driving speed ratios. Turbine torque during operation of the lowest speed ratio is distributed through the clutch 32 to the ring gear 34. Since the carrier 38 is connected to the output shaft 72, which resists rotation, reaction torque on the sun gear 42 will be distributed through the second gear unit 44 as the carrier 48 acts as a reaction member. Carrier 48 is held against rotation by the overrunning brake 58. The reaction torque in the gear unit 44 causes forward driving rotation of the ring gear 46 and the output shaft 72. Thus a split torque delivery path is established through the gearing.

If continuous operation in the lowest speed ratio is desired, or if coast braking operation in the lowest ratio is desired, brake band 54 is applied. Brake band 54 complements the braking action of the overrunning brake 58 during forward driving in the lowest ratio.

A ratio change to the intermediate speed range is accomplished by releasing brake band 54 and applying intermediate speed ratio band 64. Sun gear 42 then becomes anchored so that it may serve as a reaction element. Forward clutch 32 continues to deliver turbine torque to the ring gear 34. With the sun gear 42 acting as a reaction element, carrier 38 and the output shaft 72 are driven at an increased speed ratio. Gear unit 44 becomes inactive and overrunning brake 58 freewheels.

Forward drive operation in the high speed direct drive ratio is accomplished by releasing both brakes and applying simultaneously both clutches. This causes the elements of the gear system to be locked together for rotation in unison with a 1:1 speed ratio.

Reverse drive operation is obtained by releasing the forward drive clutch 32 and applying direct and reverse clutch 60. At the same time friction brake band 54 is applied. Turbine torque now becomes delivered directly to the sun gear 42 through clutch 60 and through the drive shell 61. With the carrier 48 anchored by the brake band 54, ring gear 46 is driven in a reverse direction.

In FIG. 1 we have shown in block diagram form a control circuit for controlling the actuation and release of the clutches and brakes shown in FIG. 1A. The circuit includes the engine driven pump 30 which applies circuit pressure to the main regulator valve 78 which in turn maintains a regulated pressure level in supply passage 80 extending to the manual valve 82. The manual valve may be adjusted to any of the positions indicated in FIG. 1 and identified by reference R, N, D.2 and 1 which, respectively, refer to reverse, neutral, automatic drive, second speed ratio drive and first speed ratio drive.

During forward drive operation in any of the ratio ranges D.2 or 1, pressure is supplied to the manual valve and through passage 84 to the forward clutch 60.

Direct reverse drive operation pressure distribution through the manual valve to the passage 84 is interrupted and pressure is distributed instead to passage 86. The manual valve also distributes pressure to passage 88 during reverse drive operation as well as during low speed ratio operation thereby allowing pressure distribution to reverse-and-low servo 56.

Selective pressure distribution to the direct-and-reverse clutch 32 and the intermediate servo 66 is provided by the 1-2 shift valve assembly 90 and the 2-3 shift valve assembly 92. The shift valves respond to governor pressure distributed to one side thereof through governor pressure passage 94 which communicates with the governor valve assembly 74. The shift valve responds also to the output pressure of a throttle pressure boost valve 96. Valve 96 receives circuit pressure from the main regulator valve and modifies it in accordance with the signal received from the output side of throttle valve 98, the latter communicating with the valve 96 through passage 100. The pressure signal in passage 102 on the output side of valve 96 is generally proportional in magnitude to the engine torque.

The throttle valve signal in passage 100 is distributed also to cut-back valve 104. When the cut-back valve assumes one operating mode, pressure is distributed through it from passage 102 to passage 106 which extends to the main regulator valve 78. When passage 106 is pressured, the main regulator valve functions to regulate pressure at a higher pressure level than the pressure level that exists with passage 106 exhausted. The cut-back valve 104 responds to governor pressure which is distributed to it from the governor pressure passage 94.

At low operating speeds during acceleration from a standing start, the cut-back valve distributes pressure to passage 106 thereby causing an increase in the line pressure. Upon an increase in vehicle speed the cut-back valve moves to exhaust passage 106. At that time the converter is operating in a higher speed ratio and the delivered torque is of a reduced magnitude.

The actuator for the throttle valve 98 is identified generally by reference character 108. It is connected to the engine intake manifold through a passage schematically indicated by reference character 110. It is connected to the exhaust manifold for the engine through a separate passage schematically indicated by reference character 112.

FIG. 2 shows in enlarged form a throttle valve and a throttle valve actuator which comprise a transmission vacuum diaphragm valve assembly. The actuator 108 of FIG. 2 comprises a first housing part 114. It is formed with an annular flange 116 at its open end.

A second housing portion 118 is received over the flange 116 and a first diaphragm 120 of flexible material is secured between the margin of the housing portion 118 and the flange 116. Housing portion 118 is connected directly to threaded fitting 122, which is secured to transmission case 124.

Throttle valve 98 includes a movable spool 126 which is slidably received within a valve opening formed in valve body 128. The valve body receives control pressure from the output side of the main regulator valve and modulates it to provide a resultant throttle pressure signal. Valve element 126 is connected directly to the movable diaphragm 120 by means of a valve actuating rod 130. Diaphragm 120 carries a central hub 132 which is engaged by the rod 130. Diaphragm 120 is urged in a right-hand direction, as viewed in FIG. 2, by spring 134 which is seated on the end wall 136 of the housing portion 114.

Wall 136 is formed in a re-entrant fashion and is apertured at 138 to receive rod 140 therethrough. A suitable seal diaphragm 142 seals the rod 140 to isolate the chamber occupied by spring 134 from the space on the right-hand side of the end wall 136. The chamber 144 on the right-hand side of the flexible diaphragm 120 is vented through opening 146 formed in the fitting 122. The space 148 on the left-hand side of wall 136 is vented to the same opening 146 through central opening 150 formed in the rod 140. The left-hand end of the rod 140 is connected to the center of a second flexible diaphragm 152. The margin of this diaphragm is secured to the end wall 136 by the overturned margin 154 of housing portion 156. A space 158 on the left-hand side of the diaphragm 152 is in communication with a manifold pressure conduit through fitting 160. The space 162 between the diaphragms 152 and 120 is connected to the engine intake manifold pressure passage through a suitable fitting 164.

Fitting 160 is connected to the EGR control 166 shown in FIG. 1. This control connected selectively the chamber 158 to the engine manifold whenever the special conditions previously described exist where the exhaust gas recirculates and would be effective to reduce undesirable engine emissions. Fitting 164, on the other hand, is connected directly to passage 112 which extends to the intake manifold.

A decrease in manifold pressure will correspond to a decrease in engine torque. The atmospheric pressure acting on the right-hand side of the diaphragm 120 then will tend to compress the spring 134. If the manifold pressure increases, diaphragm spring 134 will cause the rod 130 and the valve element 126 to be shifted slidably in a right-hand direction thereby increasing the output pressure, which is an indicator of the engine torque.

By using the secondary diaphragm 152 and subjecting it to manifold pressure when the EGR control 166 is active, an added force opposes the spring force thereby preventing a rapid throttle valve pressure buildup and preventing delayed ratio shifts as the vehicle is operated in the acceleration mode.

The embodiment of FIG. 3 is similar to the embodiment of FIG. 2 except that altitude compensating bellows 168 has been added. This bellows includes two concentrically disposed bellows elements 170 and 172 which cooperate to define a cavity 174 which is substantially evacuated. If an increase in atmospheric pressure occurs, the chamber 174 tends to become reduced in volume thereby adding a force which assists the force of the diaphragm spring. Conversely, if atmospheric pressure should be reduced, the net force acting on the diaphragm assembly is increased due to the increase in volume of the chamber 174.

One of the bellows 168 is connected to the large diaphragm assembly through retainer washer 176. The other end of the bellows 168 is anchored at 178 to the housing.

The elements of the embodiment of FIG. 3 and the counterpart elements of the embodiment of FIG. 2 have been designated by similar reference characters, although prime notations are added.

In FIG. 4 we have shown another embodiment. It includes a first housing portion 180 and a second housing portion 182 which are joined together at their margins as shown at 184. The juncture of the housing portions 180 and 182 retains the outer margin of a large flexible diaphragm 186. Housing portion 180 is secured to fitting 188, which in turn is threadably connected to the transmission case 190.

Housing portion 182 is connected at its right-hand margin to the left-hand margin of a third housing portion 192. The margins of the housing portions 182 and 192 secure the outer periphery of a second smaller flexible diaphragm 194. A vacuum pressure conduit fitting 196 is secured to a central aperture formed in the left-hand wall of the housing portion 192. This housing portion defines a spring chamber 198 in communication with a fitting 196 which in the assembly shown at FIG. 1, would be connected to intake manifold passage 112. The chamber 200 located between the two diaphragms communicates with fitting 202, which in turn is connected to the pressure conduit that extends to the EGR control 166 in the embodiment of FIG. 1. Thus the right-hand side of the diaphragm 186 is vented to the atmosphere through the fitting 188 as is the right-hand side of chamber 144 of the embodiment of FIG. 2.

During operation of the transmission system with the EGR control inactive, the spring force of diaphragm spring 204 is opposed by the force created by the intake manifold vacuum in chamber 198. When the EGR control is active, an additional force is added to the diaphragm assembly as manifold pressure is introduced into chamber 200. The diaphragms 186 and 194 are joined together for movement in unison by rod 206.

The embodiment of FIG. 5 is similar to the embodiment of FIG. 4 except that an altitude-compensating evacuated bellows is added to the assembly. The bellows is designated by reference character 208. It is similar to the bellows 168 shown in the embodiment of FIG. 3 and it performs the same function. The other elements of the construction of FIG. 5 are similar to the corresponding elements of FIG. 4, and they have been designated by similar reference characters although double prime notations are added.

It is possible to obtain an additional compensation for closed throttle operation by calibrating the diaphragm sizes so that an increased manifold pressure force would be provided as the engine throttle is moved to the zero throttle position. In these circumstances the throttle control would actuate a switch in the control 166 to connect both of the intake manifold pressure fittings to the intake manifold. One of the fittings, such as the fitting 196 of the FIG. 4 embodiment, would be connected to the intake manifold during normal engine operation with the EGR control inactive. When the EGR control is active and the engine throttle is advanced to a position beyond the lowest throttle setting, the other fitting such as the fitting 202 of the FIG. 4 embodiment, would be connected to the intake manifold and the fitting 196 of the FIG. 4 embodiment would be connected to atmosphere. The size of the diaphragms would be calibrated to provide the necessary increased diaphragm forces.

Thus, for any given operating condition the magnitude of the throttle valve pressure would be a minimum when both fittings 196 and 202 are connected to the engine intake manifold. The effective diaphragm area then is equal to the area of diaphragm 186. The highest value for a throttle valve output pressure exists when fitting 202 is connected to the intake manifold and fitting 196 is exhausted to atmosphere. An intermediate value, which is the condition that exists when the EGR control is inactive and the throttle position is advanced beyond the zero throttle setting, is obtained when fitting 196 is connected to the intake manifold and fitting 202 is exhausted to atmosphere.

The switch in the control 166, which is actuated when the throttle assumes a zero throttle setting, is identified in FIG. 1 by reference character 210.

If the engine includes an ignition spark delay control as well as an EGR valve, fitting 202 is connected to the engine intake manifold through the ignition delay valve so that the differential area of the diaphragms 194 and 186 is subjected to engine manifold vacuum whenever the engine spark advance is interrupted. At the same time, the fitting 196 may be connected to the engine intake manifold through the EGR controls. The connections between the emission control and the fittings 196 and 202 may be interchanged if the calibration of the diaphragm and the spring 204 are changed. Thus a number of variations may be made depending upon the particular rerequirements of the engine with which the throttle valve system is used.

In FIG. 6 we have shown another embodiment of our invention which is adapted to be used with an engine having both a spark delay valve and an EGR system. An appropriate switching circuit for controlling the distribution of engine intake manifold pressure to the throttle valve actuator also is illustrated.

The throttle valve actuator of FIG. 6 includes a first diaphragm 300 and a second diaphragm 302, the diameter of the latter being greater than the diameter of the former. Diaphragms 300 and 302 are joined by a stem 304. Diaphragm spring 306 urges the coupled diaphragms in a left-hand direction as viewed in FIG. 6. A fitting 308 provides a connection between the engine intake manifold and the spring chamber. A fitting 312 provides a connection between passage 314 and chamber 316 situated between the diaphragms 300 and 302.

A solenoid valve 318 provides communication between passage 314 and passage 320 which extends to the engine spark delay valve. It provides also selective communication between passage 314 and atmospheric pressure port 322. A solenoid winding for the valve 318 is controlled by an EGR microswitch 324. The atmospheric pressure port 322 in the valve 318 is brought into communication with passage 314 whenever the EGR microswitch is closed. At that time the solenoid winding for valve 318 is energized thereby shifting valve element 328 out of registry with the port 322 and into registry with port 330, which communicates with passage 320.

When the EGR controls are off, manifold pressure is distributed to both chambers 310 and 316. Thus, the manifold pressure force acting on the diaphragms is equal to the differential of the forces, which differential opposes the force of spring 306. Before the spark delay valve is actuated, however, passage 320 is subjected to atmospheric pressure and this pressure is distributed to the chambers 316. The force developed by the atmospheric pressure complements the manifold pressure force. Under these conditions passage 320 is subjected to engine manifold pressure to produce a normal spark delay. If for purposes of improving the quality of exhaust gas emissions it is necessary to interrupt the spark delay, passage 320 is connected to the atmosphere through the spark delay valve. When the EGR controls are actuated, valve element 328 moves into registry with port 330 thereby interrupting communication between passage 314 and passage 320. At the same time passage 314 is brought into communication with atmosphere. The forces that then exist on the diaphragms are the same forces that existed prior to the time the spark delay valve was actuated.

In FIG. 7 we have shown a throttle valve system for an automatic transmission for use with an internal combustion engine in a vehicle driveline. The throttle valve assembly is identified generally by reference character 400. The internal combustion engine is identified generally by reference character 402 and the automatic transmission used with the engine 402 is shown at 404. The throttle valve assembly 400 includes a housing 406 within which is assembled a pair of flexible diaphragms 408 and 410 which are coupled together by stem 412. The coupled diaphragms actuate a throttle valve stem 414 which is connected to the transmission control valve body 416 through a mechanical linkage shown schematically at 418.

Throttle valve assembly 400 includes a first pressure chamber 420 and a second pressure chamber 422. The chambers 420 and 422 are defined by the diaphragms and by the cooperating housing. Spring 424 is situated between one end of the housing and the coupled diaphragms causing the latter to be urged in a left-hand direction to a minimum upshift throttle pressure signal position.

Chamber 420 is connected through port 426 to pressure passage 428, which extends to an EGR port in the throat of carburetor 430 for engine 402. This port is adjacent the throttle valve plate so that when the throttle plate is at or near its closed position, the EGR port is subjected to engine intake manifold pressure. The EGR port is uncovered at advanced throttle settings, however, so that the pressure made available to it is at or near ambient pressure.

A vacuum valve 432 is situated in the passage 428. Valve 432 is closed when the engine operating temperature is low, but it opens and stays open during operation of the engine at normal operating temperatures. Valve 432 is sensitive to a valve actuator that responds to engine coolant temperature.

Passage 428 is connected also to chamber 434 located on one side of flexible diaphragm 436, which normally is moved in a downward direction by EGR valve spring 438 as viewed in FIG. 7. An exhaust gas recirculation (EGR) valve is shown at 440. It establishes communication between intake manifold chamber 442 and exhaust manifold chamber 444 when the diaphragm 436 moves in an upward direction. It moves against the force of spring 438 when the vacuum in passage 428 exceeds a calibrated value. This occurs only when the engine throttle is at or near the closed position.

In FIG. 8 we have shown another emissions control system, which includes a dual diaphragm throttle valve assembly. This system is a so-called spark delay system where the engine distributor is either advanced or retarded depending upon the operating mode for the transmission, the engine operating temperature and the engine throttle setting.

The engine for the vehicle driveline is shown in FIG. 8 schematically at 500. It includes an electrical distributor of a well-known type, which controls distribution of electric voltage impulses to the air-fuel mixture igniting spark plugs for the engine. The distributor determines the firing sequence as well as the timing of the spark at the spark plugs with respect to the position of the piston during the engine operating cycle.

The distributor timing is controlled by an actuator 504 which includes a primary vacuum chamber 506 and a secondary vacuum chamber 508. This actuator can be seen best by referring to FIG. 9. The engine delivers torque to the vehicle driveshaft through the transmission 510, which has multiple ratios that are controlled by an automatic control valve assembly 512.

When the transmission 510 is conditioned for operation in an underdrive ratio an electrical switch senses the ratio change and triggers the operation of vacuum pressure valve 514 causing the valve 514 to interrupt communication between passages 516 and 518. This communication is interrupted whenever the transmission operates in the underdrive ratio. When the valve 514 functions in this way, it is referred to as a transmission regulated spark switch (TRS). In the alternative it may be designed to cause the valve 514 to close when the engine speed falls below a certain minimum design speed. In that case it would be referred to as an electronic spark control (ESC). When the valve 514 acts as a TRS valve, the ESC function is not present. Conversely, when the ESC function is present the TRS function is absent. If the transmission is operating in the direct drive or high speed ratio, the switch is adapted to trigger the operation of the valve 514 to establish communication between passages 516 and 518.

Passage 516 extends to a spark port in the throat of carburetor 520 for the engine 500. The spark port is located directly adjacent the throttle valve plate for the carburetor so that the spark port is subjected to manifold pressure when the engine throttle valve is at or near the close position.

A dual diaphragm assembly is shown schematically at 522. It includes a first diaphragm 524 and a second diaphragm 526 of larger area. The diaphragms are coupled together mechanically and are urged in a left-hand direction as viewed in FIG. 8 by diaphragm spring 528. The diaphragms in the surrounding housing 530 define vacuum chambers 532 and 534. A mechanical connection between the coupled diaphragms and the transmission throttle valve assembly in the control valve circuit 512 is indicated schematically at 536. Chamber 534 communicates with passage 538 through port 540. Passage 538 extends to the engine intake manifold 541 for the engine 500.

In FIG. 9 the chamber 506 contains a spring 542 which acts upon flexible diaphragm 544. A second flexible diaphragm 546, which defines in part chamber 508, carries a center plate 550 which is received within recess 552 in distributor adjusting stem 554. When the stem 554 is moved in a right-hand direction, the distributor is retarded. When it is moved in a left-hand direction, it is advanced. The size of the recess 552 is sufficient to permit a slight degree of distributor advance independently of the diaphragm 546. When the engine is at idle, the diaphragms assume the positions shown in FIG. 9, at which time diaphragm spring 542 and secondary diaphragm spring 558 become balanced.

When the distributor is advanced, the center of the diaphragm 548 becomes unseated from stop 560.

Chamber 508 is connected to the engine intake manifold through passage 556. Chamber 506 is connected to the spark port in the carburetor throat through passage 559 and passage 518 which, as explained previously, is connected to the passage 516 and the spark port through the valve 514. When the transmission is operated in the high speed ratio at normal operating temperature, passage 518 is connected to passage 559 through the ported vacuum switch 561. If the engine becomes overheated, passage 559 becomes connected to passage 556 through the valve 561. Passage 556 is connected to the intake manifold pressure passage 538.

An engine spark delay valve 562 is located in the passage 559. It includes a flow restricting orifice 564 which delays the rate of advance of the distributor as air in chamber 506 becomes evacuated. Under certain operating conditions when it is desired to increase the rate of retard for the distributor, a one-way flow valve 566 is adapted to permit rapid movement of the distributor adjustment to the retard position thus by-passing the orifice 564.

Valve 568, which is similar to the spark delay valve 562, is located in passage 570, which extends to port 572 communicating with chamber 532. Passage 570 extends to passage 559 so that the transmission diaphragm assembly 522, and more particularly the chamber 532, will be subjected to the same pressure that exists in chamber 506. Relatively rapid increases in pressure in passage 532 can be effected by reason of the one-way flow valve 574 although reductions in the pressure in passage 532 are retarded by reason of the flow restricting orifice 576.

An increase in the pressure in chamber 532, which normally would correspond to a retarding of the distributor, tends to oppose the force of spring 528 which results in a lower effective output pressure signal for the transmission throttle valve assembly. This causes the transmission throttle valve assembly to produce a signal that more accurately reflects the actual engine torque as the engine distributor is advanced and retarded under the various operating conditions in an effort to reduce engine exhaust emissions.

Having thus described preferred forms of our invention, what we claim and desire to secure by U.S. Letters Patent is:

1. A control valve system for an automatic power transmission mechanism for use with an internal combustion engine in a wheeled automotive vehicle driveline having an air-fuel mixture intake manifold and an exhaust gas manifold, said engine having an engine distributor adapted to deliver timed fuel ignition pulses for the engine, an engine throttle controlled carburetor throat, a pneumatically operated means connected to the engine carburetor throat for retarding the timing of the distributor for any given operating speed of the engine, said transmission mechanism having geared, multiple speed ratio torque delivery paths between said engine and the vehicle traction wheels, valve means for controlling speed ratio change in said geared torque delivery paths including a transmission vacuum diaphragm valve assembly having an actuator housing and a pair of diaphragms located in said housing and defining therein a pair of pressure chambers, said diaphragms being coupled together and connected to a pressure modulator transmission throttle valve the output of which is utilized as an engine torque signal, a pressure passage connecting one of said transmission vacuum diaphragm valve assembly chambers to the pneumatic distributor timing retarding means and a second pressure passage connecting the other transmission vacuum diaphragm valve assembly chamber to the engine intake manifold, spring means for urging the diaphragms toward an increased throttle pressure output signal position, the pressure forces established on said diaphragms by the pressure in said other transmission vacuum diaphragm valve assembly chamber opposing the force of said spring means.

2. The combination as set forth in claim 1 wherein the diaphragms of said throttle valve assembly have a differential area, the first chamber of said throttle valve assembly being located between and partly defined by said diaphragms, the other chamber of said transmission throttle valve assembly being located on one side of the larger of said diaphragms and partly defined by said larger diaphragm and said housing.

3. A control valve system for an automatic power transmission mechanism for use in an internal combustion engine in a wheeled automotive vehicle driveline, said engine having an air-fuel mixture intake manifold and an engine carburetor with engine throttle controlled carburetor throat communicating with said manifold, an exhaust gas recirculation valve means for establishing controlled communication between said intake manifold and an engine exhaust gas region, a pneumatic actuator for said exhaust gas recirculation valve, a pressure passage connecting said carburetor throat and said actuator, said transmission mechanism having geared, multiple speed ratio torque delivery paths between said engine and the vehicle traction wheels, valve means for controlling ratio changes in said geared torque delivery paths including a transmission vacuum diaphragm valve assembly adapted to produce a throttle pressure signal that is proportional in magnitude to engine torque including a modulator valve and an actuator for said modulator valve, said transmission modulator valve actuator comprising a pair of diaphragms coupled together, means for transmitting forces on said diaphragm to said modulator valve, a transmission throttle valve actuator housing enclosing said diaphragms, a first pressure chamber located between said diaphragms and defined by said diaphragms and said housing, a second pressure chamber located on one side of said coupled diaphragms and defined by one of said diaphragms and said housing, and spring means for urging said diaphragms in one direction tending to produce an increase in the throttle pressure signal, said second chamber communicating with said intake manifold and said first chamber communicating with said carburetor throat.

4. The combination as set forth in claim 3 wherein said diaphragms are of differential area, the diaphragm that partly defines said second chamber having a smaller effective area than the effective area of the other diaphragm of said throttle valve assembly.

* * * * *